United States Patent [19]

Tsuruta

[11] Patent Number: 5,223,587
[45] Date of Patent: Jun. 29, 1993

[54] ADHESIVE COMPOSITION FOR WOOD

[75] Inventor: Natsuhi Tsuruta, Tokyo, Japan

[73] Assignee: Oshika Shinko Co. Ltd., Tokyo, Japan

[21] Appl. No.: 927,246

[22] Filed: Aug. 7, 1992

Related U.S. Application Data

[63] Continuation of Ser. No. 637,309, Jan. 3, 1991, abandoned.

[51] Int. Cl.$^5$ .............. C08L 61/04; C08L 61/10; C08L 61/00
[52] U.S. Cl. .................. 525/501; 525/480; 525/491
[58] Field of Search .............. 525/480, 491, 501

[56] References Cited

U.S. PATENT DOCUMENTS

| | | | |
|---|---|---|---|
| 3,755,258 | 8/1973 | Tiedman | 525/504 |
| 3,857,815 | 12/1974 | Smith et al. | 525/504 |
| 3,878,021 | 4/1974 | Tiedman | 525/504 |
| 3,933,936 | 1/1976 | Smith et al. | 525/504 |
| 3,947,425 | 3/1976 | Freeman et al. | 525/504 |
| 4,003,873 | 1/1977 | Smith | 525/504 |
| 4,170,611 | 10/1979 | Jostew et al. | 525/494 |
| 4,209,433 | 6/1980 | Hse | 525/504 |
| 4,285,848 | 8/1981 | Hickson | 525/504 |
| 4,482,675 | 11/1984 | Witt | 525/385 |
| 4,594,384 | 6/1986 | Kilpeläinen et al. | 525/54.5 |
| 4,824,896 | 4/1989 | Clarke et al. | 525/501 |

Primary Examiner—James J. Seidleck
Assistant Examiner—W. R. M. Clark
Attorney, Agent, or Firm—Kenyon & Kenyon

[57] ABSTRACT

Disclosed is an adhesive composition for wood comprising a phenol resin adhesive and a phenol resin highly condensed in a mole ratio (F/P) of formaldehyde (F) to a phenol (P) in the range of 0.8:1 to 1.5:1, having a softening point of 100° to 200° C. and having a number average molecular weight of 2,000 or more, whereby the adhesive is accelerated in hardening to impart fast setting-ability thereto, which causes the pressing temperature to be reduced and makes it possible to raise the allowable moisture content of adherends.

1 Claim, 1 Drawing Sheet

ADHESIVE COMPOSITION FOR WOOD

This application is a continuation of application Ser. No. 07/637,309 filed Jan. 3, 1991, now abandoned.

BACKGROUND OF THE INVENTION

The present invention relates to an adhesive composition for wood, and more specifically to an improvement of a phenol resin adhesive, particularly an alkali phenol resin adhesive.

As one measure to enlarge the use of soft woods, the production of bonded products such as structural veneer laminated lumber(LVL), structural plywood and particle boards have been considered. However, when amino resin adhesives represented by melamine-formaldehyde resins and urea-formaldehyde resins are used as adhesives for these bonded products, the products are insufficient in bonding property and in durability. To increase the reliability to the products, and to enlarge and ensure the use thereof in the long term, it is said that phenol resin adhesives represented by phenol-formaldehyde resins and phenolmelamine-formaldehyde resins excellent in bonding property and durability are preferably used. Of these phenol resin adhesives, water-soluble alkali phenol resin adhesives particularly have excellent durability. For this reason, bonded wood products such as plywood and LVL produced by using the water-soluble alkali phenol resin adhesives are also utilized as outdoor portions requiring durability. As a drawback, however, the above adhesives require a higher temperature and a longer time in hot pressing for the production of the products, compared with the amino resin adhesives. This causes low workability, a decrease in thickness of the product after pressing and deterioration of the surface thereof. In addition, the above adhesives are poor in thermosetting property in the presence of moisture. It is therefore indispensable to dry adherends, and they are used under absolutely dried conditions as a general rule.

For the purpose of improving the amino resin adhesives, particularly improving their water resistance and reducing their formalin odor, it is proposed to incorporate phenol resin powders in the amino resin adhesives (Japanese Patent Unexamined Publication No. 58-84876/1983).

On the other hand, as a method for improving these drawbacks of the above phenol resin adhesives, the method of incorporating highly condensed phenol resin powders therein is proposed [*Collected Summaries of Research Presentations at the 35th Meeting of the Japanese Wood Society*, item 2C01, p. 188 (1985); and *Collected Summaries of Research Presentations at the 37th Meeting of the Japanese Wood Society*, item 7120, p. 290 (1987)].

SUMMARY OF THE INVENTION

It is therefore an object of the present invention to provide a more effectively improved technique when the highly condensed phenol resins are incorporated in the phenol resin adhesives as described above.

As a result of intensive research, the present inventor discovered that a high-molecular-weight phenol resin highly condensed in a mole ratio (F/P) of formaldehyde (F) to a phenol (P) in the range of 0.8:1 to 1.5:1 and having a softening point as high as 100° to 200° C. was more effective against the phenol resin adhesives, and completed the present invention based on this finding.

Namely, the present invention provides an adhesive composition for wood comprising a phenol resin adhesive and a phenol resin highly condensed in a mole ratio (F/P) of formaldehyde (F) to a phenol (P) in the range of 0.8:1 to 1.5:1, having a softening point of 100° to 200° C. and having a number average molecular weight of 2,000 or more.

DESCRIPTION OF THE PREFERRED EMBODIMENTS

Figure 1:
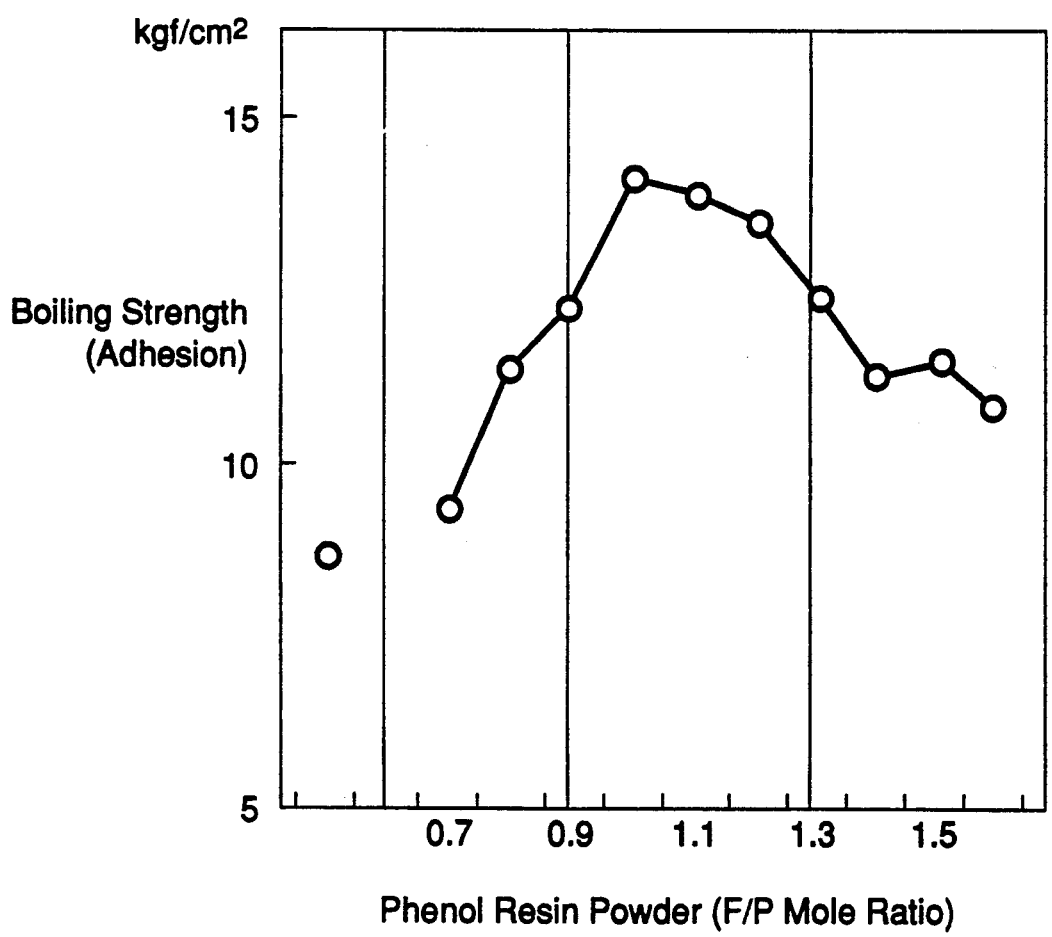
FIG. 1 is a graph showing an adhesion effect of the present invention.

In the present invention, the above phenol resins are added to the phenol resin adhesives, whereby the adhesives are accelerated in curing to impart fast setting-ability thereto, which causes the pressing temperature to be reduced and makes it possible to raise the allowable moisture content of adherends. In this case, it has been revealed that the above-described capabilities are more improved, particularly the bonding durability of plywood and the like can be significantly improved, by selecting the mole ratio (F/P) of formaldehyde to a phenol within the range of 0.8:1 to 1.5:1, preferably 0.9:1 to 1.3:1.

The phenol resins used in the present invention are highly polymerized and have a high softening point of 100° to 200° C., preferably 110° to 180° C. If the softening point is lower than 100° C., it is difficult to impart the fast setting-ability to the resins, to reduce the hot pressing temperature and to heighten the allowable moisture content of the adherends. If the softening point is higher than 200° C., similar problems are encountered and the resins having such a high softening point are not practical in respect to their preparation.

From the desired object of the present invention, it is preferred that the number average molecular weight of the phenol resins is 2,000 or more.

The phenol resins are produced by proceeding with condensation reaction close to the gel point, and usually obtained in a powder form because they are insoluble in water under neutral to acidic conditions. However, the phenol resins may be used in any form such as a slurry form.

As the phenol resin powder, a powder is preferably used which is obtained by adding water successively when the resin viscosity increases with the progress of the condensation reaction to reduce the resin concentration, and then adding an acid such as hydrochloric acid to the resulting reaction product to precipitate a finely divided resin, followed by filtration and drying, as shown in Examples described later.

As the phenol resin, any of a novolak type and a resol type may be used. However, the novolak type is preferred.

As the phenols described above, phenol is preferably used. However, phenols such as resorcinol and cresol may also be used.

As the phenol resin adhesives used in the present invention, various kinds of adhesives which are used as adhesives for wood are available. However, an adhesive mainly comprising a so-called PF resin which are obtained by the reaction of formaldehyde with phenol is preferably used.

Resins partially modified with resorcinol, cresol, xylene, tannin, lignin, melamine, urea or the like may also be used.

In the present invention, when the phenol resin powder is incorporated in the phenol resin adhesive to form the adhesive composition, the phenol resin powder is incorporated in an amount of 2 to 50 parts by weight per 100 parts by weight of phenol resin adhesive. If the phenol resin powder is incorporated in an amount of less than 2 parts by weight, the desired effect of the present invention can not be sufficiently obtained. Also, if the amount of the phenol resin powder incorporated exceeds 50 parts by weight, it is difficult to obtain the effect of the present invention, and the incorporation of such a large amount of phenol resin powder is uneconomical.

To the adhesive compositions of the present invention may be added various additives such as fillers, extenders and hardening accelerators, as so required.

The present invention is hereinafter illustrated based on Examples and Comparative Example.

PRODUCTION EXAMPLE 1

Production Example of Phenol Resin Powder

In a reaction vessel were placed 188 g of phenol, 137.8 g of 37% formalin and 1.9 g of p-toluenesulfonic acid, followed by reaction at 85° C. for 90 minutes. The temperature of the reaction system was reduced to 65° C., and then 16 g of 50% sodium hydroxide and 24.3 g of 37% formalin were added thereto, followed by reaction for 30 minutes. Then, 48 g of 50% sodium hydroxide was added thereto, and the reaction temperature was elevated to 95° C. to continue the condensation reaction for 3 hours. When the resin viscosity was increased with the condensation reaction, water was successively added to reduce the final resin concentration to 15%. Hydrochloric acid was gradually added to the resulting reaction product at room temperature with stirring to adjust the pH of the system to 4 to 5, thereby precipitating a finely divided resin. After filtration and drying, a phenol resin powder was obtained.

EXAMPLES 1 AND 2 AND COMPARATIVE EXAMPLE 1

The phenol resin powder obtained in the above Production Example 1 was incorporated in the following alkali phenol resin adhesive to prepare alkali phenol adhesive paste solutions having the compositions (indicated by parts by weight) shown in Table 1.

TABLE 1

|  | Example 1 | Example 2 | Comparative Example 1 |
|---|---|---|---|
| Phenol resin adhesive | 100 | 100 | 100 |
| Phenol resin powder | 5 | 10 | 0 |
| Coconut shell powder | 17 | 12 | 20 |
| Water | 12 | 12 | 12 |
| Hardening accelerator | 4 | 4 | 4 |

Alkali phenol resin adhesive: "Oshika Resin Deernol No. 17" manufactured by Oshika Shinko Co., Ltd. (viscosity: 150 cps/25° C.)

The low temperature pressing was performed by using each of the above-described compounds under the conditions shown in Table 2, and the plywood test was carried out for the moisture-containing veneers. The results are shown in Table 3.

TABLE 2

|  | Test A | Test B |
|---|---|---|
| Veneer structure | 3.2 mm, Douglas fir, 3 plies | |
| Moisture content of veneer | Not more than 4% | 12–13% |
| Spread | 200 g/m² (spread on one face to be bonded) | |
| Cold pressing | 20° C. × 10 kgf/cm² × 20 minutes | |
| Hot pressing | | |
| Temperature | 125° C. | 150° C. |
| Pressure | 10 kgf/cm² | |
| Time | 20, 30 sec/mm | 60, 70 sec/mm |

TABLE 3

|  | Example 1 Phenol resin powder 5 parts | Example 2 Phenol resin powder 10 parts | Comparative Example 1 Phenol resin powder 0 part |
|---|---|---|---|
| Test A | | | |
| 20 sec/mm | 12.0 (21) | 14.2 (69) | 8.6 (6) |
| 30 sec/mm | 14.5 (78) | 15.3 (94) | 13.5 (68) |
| Test B | | | |
| 60 sec/mm | 10.6 (38) | 11.5 (61) | Unable to be bonded |
| 70 sec/mm | 12.3 (20) | 12.9 (66) | Unable to be bonded |

Numerical values indicate the shear strength after 72-hour boiling (kgf/cm²). Numerical values in parentheses indicate the wood failure ratio (%).

PRODUCTION EXAMPLE 2

Changing the mole ratio (F/P) of formaldehyde (F) to phenol (P), phenol resin powders were prepared in a manner similar to that of Production Example 1.

Each of the phenol resin powders prepared in the various mole ratios was incorporated in the commercial alkali phenol resin in an amount of 10 parts by weight per 100 parts by weight of alkali phenol resin. The adhesion of the plywood bonded with the adhesive paste solutions prepared above was examined. The results are shown in FIG. 1.

What is claimed is:

1. An adhesive composition for wood comprising a phenol resin adhesive and a phenol resin powder additive, said phenol resin powder being highly condensed in a mole ratio (F/P) of formaldehyde (F) to a phenol (P) in the range of 0.9:1 to 1.3:1, having a softening point of 100° to 200° C. and having a number average molecular weight of 2,000 or more wherein said phenol resin powder is a novolak, and wherein said novolak phenol resin powder is present in an amount of 25 to 50 parts by weight per 100 parts by weight of said phenol resin adhesive.

* * * * *